US011961361B2

(12) United States Patent
Huke et al.

(10) Patent No.: US 11,961,361 B2
(45) Date of Patent: Apr. 16, 2024

(54) METHOD OF DISPLAYING SPORTS NEWS RELATED TO A PLACED WAGER

(71) Applicant: AdrenalineIP, Washington, DC (US)

(72) Inventors: Casey Alexander Huke, Washington, DC (US); John Cronin, Jericho, VT (US); Joseph W. Beyers, Saratoga, CA (US); Michael D'Andrea, Burlington, VT (US)

(73) Assignee: AdrenalineIP, Washington, DC (US)

( * ) Notice: Subject to any disclaimer, the term of this patent is extended or adjusted under 35 U.S.C. 154(b) by 0 days.

(21) Appl. No.: 17/375,274

(22) Filed: Jul. 14, 2021

(65) Prior Publication Data

US 2022/0122407 A1 Apr. 21, 2022

Related U.S. Application Data

(60) Provisional application No. 63/094,507, filed on Oct. 21, 2020.

(51) Int. Cl.
*G07F 17/32* (2006.01)
*G06F 16/953* (2019.01)

(52) U.S. Cl.
CPC .......... *G07F 17/323* (2013.01); *G06F 16/953* (2019.01); *G07F 17/3288* (2013.01)

(58) Field of Classification Search
CPC .. G07F 17/323; G07F 17/3288; G06F 16/953; G06F 16/9538
See application file for complete search history.

(56) References Cited

U.S. PATENT DOCUMENTS

| 11,361,040 | B2 * | 6/2022 | Nayak | G06F 16/9538 |
| 2002/0147670 | A1 * | 10/2002 | Lange | G06Q 30/08 |
| | | | | 705/37 |
| 2002/0155885 | A1 * | 10/2002 | Shvili | G06Q 50/34 |
| | | | | 463/25 |
| 2013/0217475 | A1 | 8/2013 | Guan | |
| 2016/0140804 | A1 | 5/2016 | Morgan | |
| 2019/0304259 | A1 | 10/2019 | Joao | |
| 2020/0027303 | A1 * | 1/2020 | Thomas | G07F 17/323 |
| 2020/0133452 | A1 * | 4/2020 | Gupta | G06F 3/0484 |
| 2021/0019982 | A1 * | 1/2021 | Todd | H04N 21/4438 |
| 2021/0081566 | A1 * | 3/2021 | Broudou | G06N 20/10 |
| 2021/0319171 | A1 * | 10/2021 | Wallace | G06F 40/123 |
| 2022/0075793 | A1 * | 3/2022 | Jezewski | G06F 40/247 |
| 2022/0144832 | A1 * | 5/2022 | Jia | C07D 471/04 |

FOREIGN PATENT DOCUMENTS

| WO | WO-0165506 A2 * | 9/2001 | G06Q 50/34 |
| WO | WO-0193128 A2 * | 12/2001 | G06Q 50/34 |
| WO | WO-2022094223 A1 * | 5/2022 | G06F 16/9535 |

OTHER PUBLICATIONS

Notification of Transmittal of the International Search Report and the Written Opinion of the International Searching Authority dated Jan. 27, 2022, in connection with corresponding International Application No. PCT/US21/55773, 33 pages.

* cited by examiner

Primary Examiner — James S. McClellan
Assistant Examiner — Ross A Williams
(74) Attorney, Agent, or Firm — Maier & Maier, PLLC

(57) ABSTRACT

A method of displaying sports news relevant to at least one wager being considered by the user. For example, news about a particular player.

11 Claims, 2 Drawing Sheets

| News Title | News Content | Source | Date |
|---|---|---|---|
| Each team's most pleasant surprise ... so far | Each new baseball season brings with it plenty of unexpected outcomes and performances. Whether it's a highly touted rookie living up to some lofty expectations or a career journeyman suddenly breaking out with a new club or a team's expected weakness instead proving to be a strength, every team has its share of surprises... | mlb.com | May 16th, 2021 |
| MLB Stat Leaders 2021 | Batting Leaders - All MLB BATTING AVERAGE 1 Yermin Mercedes ... | espn.com | May 16th, 2021 |
| Seager placed on IL with fractured right hand | LOS ANGELES -- The Dodgers have overcome an avalanche of injuries so far this season, but now they're going to be without Corey Seager for an extended period of time, as X-rays showed the star shortstop suffered a fractured right hand in Saturday's 7-0 win against the Marlins. | mlb.com | May 16th, 2021 |
| - | - | - | - |
| - | - | - | - |

News Database

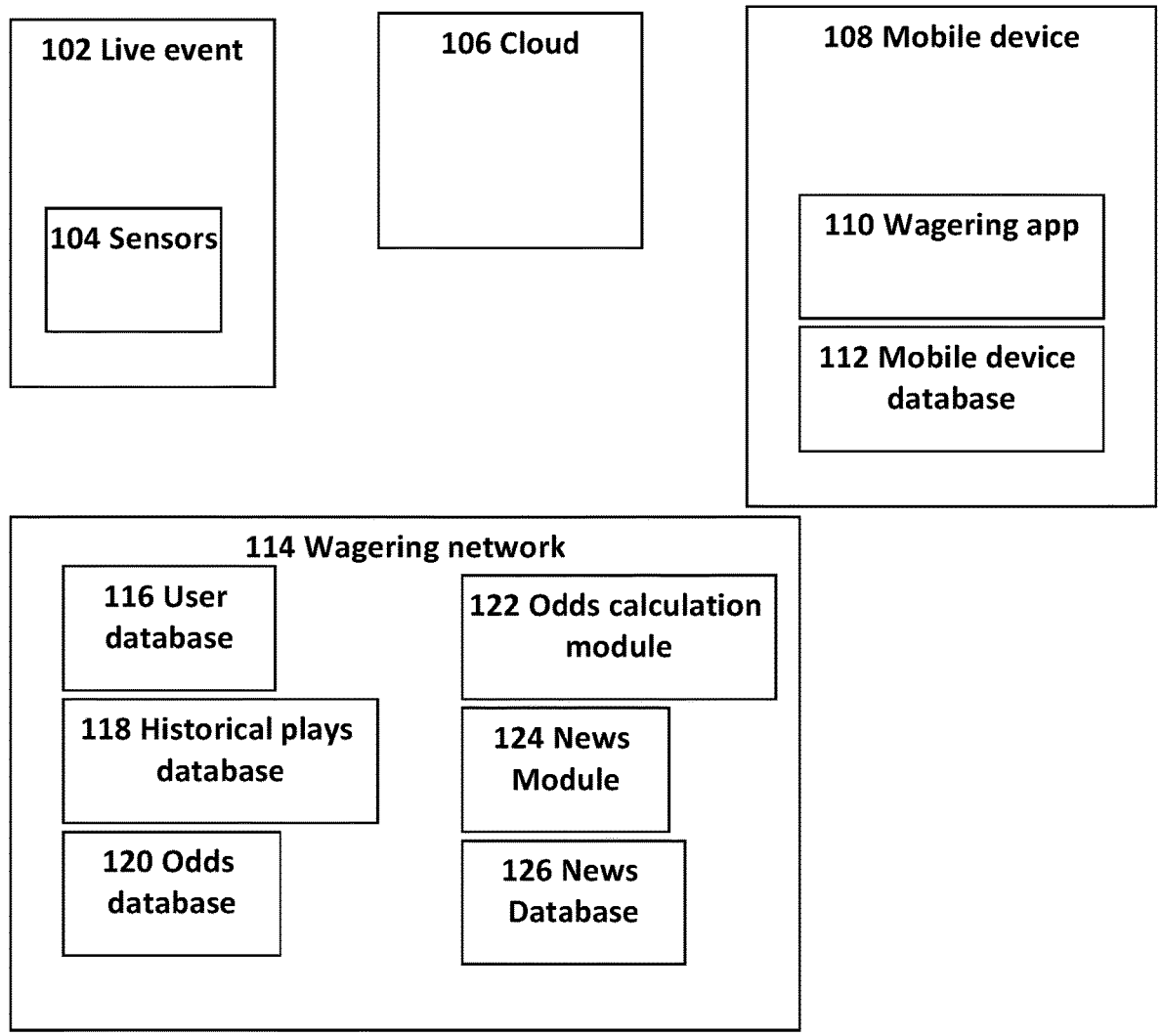
Fig.1 System for Displaying News Related to a Wager

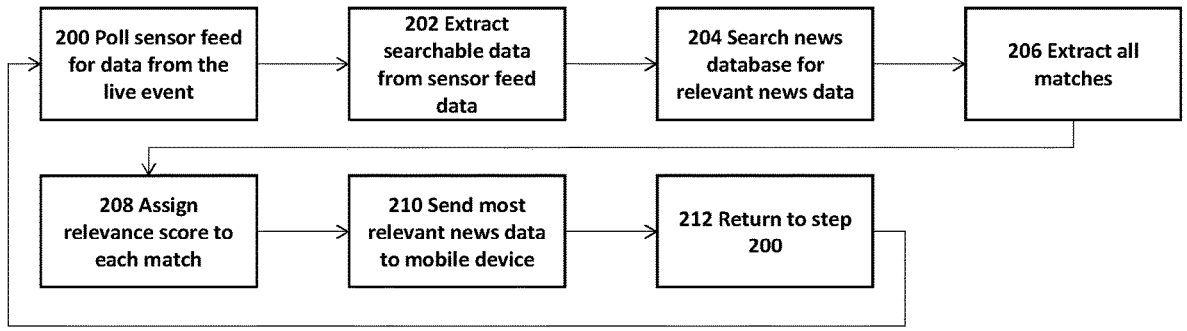

Fig.2 News Module

| News Title | News Content | Source | Date |
|---|---|---|---|
| Each team's most pleasant surprise ... so far | Each new baseball season brings with it plenty of unexpected outcomes and performances. Whether it's a highly touted rookie living up to some lofty expectations or a career journeyman suddenly breaking out with a new club or a team's expected weakness instead proving to be a strength, every team has its share of surprises... | mlb.com | May 16th, 2021 |
| MLB Stat Leaders 2021 | Batting Leaders - All MLB<br>BATTING AVERAGE<br>1<br>Yermin Mercedes<br>... | espn.com | May 16th, 2021 |
| Seager placed on IL with fractured right hand | LOS ANGELES -- The Dodgers have overcome an avalanche of injuries so far this season, but now they're going to be without Corey Seager for an extended period of time, as X-rays showed the star shortstop suffered a fractured right hand in Saturday's 7-0 win against the Marlins. | mlb.com | May 16th, 2021 |
| - | - | - | - |
| - | - | - | - |

Fig.3 News Database

METHOD OF DISPLAYING SPORTS NEWS RELATED TO A PLACED WAGER

FIELD

The present embodiments are generally related to play-by-play wagering on live sporting events.

BACKGROUND

Wagering on individual plays of a live sporting event, or micro-betting, is a type of wagering that has a very short time window in which a bettor may place a wager.

This short time window may be problematic for people who prefer to research prior to placing a wager due to the limited timeframe in which one may gather relevant information.

The time spent closing an application and opening another can be critical, especially when the betting window is on the order of minutes or even seconds. Users need a way to quickly obtain relevant information without having to exit the application used to place a wager. D

SUMMARY

Methods and systems for displaying sports news related to an offered wager. In one embodiment, a method includes offering a wager on a wagering device that is communicatively coupled to a wagering network; collecting real-time sensor data from a live sporting event; extracting searchable data from the sensor data; searching for information on news from a database based on the searchable data from the sensor data or default search terms; and displaying the new information on an at least one mobile device that is communicatively coupled with the wagering network.

In another embodiment, a system for displaying sports news related to an offered wager may include a live sporting event upon which wagers are offered; one or more sensors that collect data from the live sporting event; at least one user device with a display; a wagering network communicatively coupled with the at least one user device; a database which contains news data related to the live event; and a news module which collects data from the one or more sensors and searches the database for news data related to aspects of the live event.

In another embodiment, a method for displaying relevant data from a database of news on a mobile device associated with a wagering network may be provided. The method may include, executing on a processor the steps of: displaying data associated with a live sporting event, displaying one or more available wagers associated with the live sporting event, displaying a placed wager, displaying an indication that sensor data associated with a subject of the placed wager is available, and displaying a list of news associated with the sensor data.

BRIEF DESCRIPTIONS OF THE DRAWINGS

The accompanying drawings illustrate various embodiments of systems, methods, and various other aspects of the embodiments. Any person with ordinary skill in the art will appreciate that the illustrated element boundaries (e.g., boxes, groups of boxes, or other shapes) in the figures represent an example of the boundaries. It may be understood that, in some examples, one element may be designed as multiple elements or that multiple elements may be designed as one element. In some examples, an element shown as an internal component of one element may be implemented as an external component in another and vice versa. Furthermore, elements may not be drawn to scale. Non-limiting and non-exhaustive descriptions are described with reference to the following drawings. The components in the figures are not necessarily to scale, emphasis instead being placed upon illustrating principles.

FIG. 1: illustrates a system for displaying news related to a wager, according to an embodiment.

FIG. 2: illustrates a news module, according to an embodiment.

FIG. 3: illustrates a news database, according to an embodiment.

DETAILED DESCRIPTION

Aspects of the present invention are disclosed in the following description and related figures directed to specific embodiments of the invention. Those of ordinary skill in the art will recognize that alternate embodiments may be devised without departing from the spirit or the scope of the claims. Additionally, well-known elements of exemplary embodiments of the invention will not be described in detail or will be omitted so as not to obscure the relevant details of the invention.

As used herein, the word exemplary means serving as an example, instance, or illustration. The embodiments described herein are not limiting but rather are exemplary only. It should be understood that the described embodiments are not necessarily to be construed as preferred or advantageous over other embodiments. Moreover, the terms embodiments of the invention, embodiments, or invention do not require that all embodiments of the invention include the discussed feature, advantage, or mode of operation.

Further, many of the embodiments described herein are described in terms of sequences of actions to be performed by, for example, elements of a computing device. It should be recognized by those skilled in the art that the various sequence of actions described herein can be performed by specific circuits (e.g., application specific integrated circuits (ASICs)) and/or by program instructions executed by at least one processor. Additionally, the sequence of actions described herein can be embodied entirely within any form of computer-readable storage medium such that execution of the sequence of actions enables the processor to perform the functionality described herein. Thus, the various aspects of the present invention may be embodied in several different forms, all of which have been contemplated to be within the scope of the claimed subject matter. In addition, for each of the embodiments described herein, the corresponding form of any such embodiments may be described herein as, for example, a computer configured to perform the described action.

With respect to the embodiments, a summary of the terminology used herein is provided.

An action refers to a specific play or specific movement in a sporting event. For example, an action may determine which players were involved during a sporting event. In some embodiments, an action may be a throw, shot, pass, swing, kick, and/or hit performed by a participant in a sporting event. In some embodiments, an action may be a strategic decision made by a participant in the sporting event, such as a player, coach, management, etc. In some embodiments, an action may be a penalty, foul, or type of infraction occurring in a sporting event. In some embodiments, an action may include the participants of the sporting event. In some embodiments, an action may include beginning events of sporting event, for example, opening tips, coin flips, opening pitch, national anthem singers, etc. In some embodiments, a sporting event may be football, hockey, basketball, baseball, golf, tennis, soccer, cricket, rugby, MMA, boxing, swimming, skiing, snowboarding, horse racing, car racing, boat racing, cycling, wrestling, Olympic sport, eSports, etc. Actions can be integrated into the embodiments in a variety of manners.

A "bet" or "wager" is to risk something, usually a sum of money, against someone else's or an entity based on the outcome of a future event, such as the results of a game or event. It may be understood that non-monetary items may be the subject of a "bet" or "wager" as well, such as points or anything else that can be quantified for a "wager" or "bet." A bettor refers to a person who bets or wagers. A bettor may also be referred to as a user, client, or participant throughout the present invention. A "bet" or "wager" could be made for obtaining or risking a coupon or some enhancements to the sporting event, such as better seats, VIP treatment, etc. A "bet" or "wager" can be made for a certain amount or for a future time. A "bet" or "wager" can be made for being able to answer a question correctly. A "bet" or "wager" can be made within a certain period. A "bet" or "wager" can be integrated into the embodiments in a variety of manners.

A "book" or "sportsbook" refers to a physical establishment that accepts bets on the outcome of sporting events. A "book" or "sportsbook" system enables a human working with a computer to interact, according to a set of both implicit and explicit rules, in an electronically powered domain to place bets on the outcome of a sporting event. An added game refers to an event not part of the typical menu of wagering offerings, often posted as an accommodation to patrons. A "book" or "sportsbook" can be integrated into the embodiments in a variety of manners.

To "buy points" means a player pays an additional price (more money) to receive a half-point or more in the player's favor on a point spread game. Buying points means you can move a point spread, for example, up to two points in your favor. "Buy points" can be integrated into the embodiments in a variety of manners.

The "price" refers to the odds or point spread of an event. To "take the price" means betting the underdog and receiving its advantage in the point spread. "Price" can be integrated into the embodiments in a variety of manners.

"No action" means a wager in which no money is lost or won, and the original bet amount is refunded. "No action" can be integrated into the embodiments in a variety of manners.

The "sides" are the two teams or individuals participating in an event: the underdog and the favorite. The term "favorite" refers to the team considered most likely to win an event or game. The "chalk" refers to a favorite, usually a heavy favorite. Bettors who like to bet big favorites are referred to as "chalk eaters" (often a derogatory term). An event or game in which the sportsbook has reduced its betting limits, usually because of weather or the uncertain status of injured players, is referred to as a "circled game." "Laying the points or price" means betting the favorite by giving up points. The term "dog" or "underdog" refers to the team perceived to be most likely to lose an event or game. A "longshot" also refers to a team perceived to be unlikely to win an event or game. "Sides," "favorite," "chalk," "circled game," "laying the points price," "dog," and "underdog" can be integrated into the embodiments in a variety of manners.

The "money line" refers to the odds expressed in terms of money. With money odds, whenever there is a minus (−), the player "lays" or is "laying" that amount to win (for example, $100); where there is a plus (+), the player wins that amount for every $100 wagered. A "straight bet" refers to an individual wager on a game or event that will be determined by a point spread or money line. The term "straight-up" means winning the game without any regard to the "point spread"; a "money-line" bet. "Money line," "straight bet," "straight-up" can be integrated into the embodiments in a variety of manners.

The "line" refers to the current odds or point spread on a particular event or game. The "point spread" refers to the margin of points by which the favored team must win an event to "cover the spread." To "cover" means winning by more than the "point spread." A handicap of the "point spread" value is given to the favorite team so bettors can choose sides at equal odds. "Cover the spread" means that a favorite wins an event with the handicap considered, or the underdog wins with additional points. To "push" refers to when the event or game ends with no winner or loser for wagering purposes, a tie for wagering purposes. A "tie" is a wager in which no money is lost or won because the teams' scores were equal to the number of points in the given "point spread." The "opening line" means the earliest line posted for a particular sporting event or game. The term "pick" or "pick em" refers to a game when neither team is favored in an event or game. "Line," "cover the spread," "cover," "tie," "pick," and "pick-em" can be integrated into the embodiments in a variety of manners.

To "middle" means to win both sides of a game, wagering on the "underdog" at one point spread and the favorite at a different point spread and winning both sides. For example, if the player bets the underdog +4½ and the favorite −3½ and the favorite wins by 4, the player has middled the book and won both bets. "Middle" can be integrated into the embodiments in a variety of manners.

Digital gaming refers to any type of electronic environment that can be controlled or manipulated by a human user for entertainment purposes. A system that enables a human and a computer to interact according to a set of both implicit and explicit rules in an electronically powered domain for the purpose of recreation or instruction. "eSports" refers to a form of sports competition using video games, or a multiplayer video game played competitively for spectators, typically by professional gamers. Digital gaming and "eSports" can be integrated into the embodiments in a variety of manners.

The term event refers to a form of play, sport, contest, or game, especially one played according to rules and decided by skill, strength, or luck. In some embodiments, an event may be football, hockey, basketball, baseball, golf, tennis, soccer, cricket, rugby, MMA, boxing, swimming, skiing, snowboarding, horse racing, car racing, boat racing, cycling, wrestling, Olympic sport, etc. The event can be integrated into the embodiments in a variety of manners.

The "total" is the combined number of runs, points, or goals scored by both teams during the game, including overtime. The "over" refers to a sports bet in which the player wagers that the combined point total of two teams will be more than a specified total. The "under" refers to bets that the total points scored by two teams will be less than a certain figure. "Total," "over," and "under" can be integrated into the embodiments in a variety of manners.

A "parlay" is a single bet that links together two or more wagers; to win the bet, the player must win all the wagers in the "parlay." If the player loses one wager, the player loses the entire bet. However, if he wins all the wagers in the "parlay," the player wins a higher payoff than if the player had placed the bets separately. A "round robin" is a series of parlays. A "teaser" is a type of parlay in which the point spread, or total of each individual play is adjusted. The price of moving the point spread (teasing) is lower payoff odds on winning wagers. "Parlay," "round-robin," "teaser" can be integrated into the embodiments in a variety of manners.

A "prop bet" or "proposition bet" means a bet that focuses on the outcome of events within a given game. Props are often offered on marquee games of great interest. These include Sunday and Monday night pro football games, various high-profile college football games, major college bowl games, and playoff and championship games. An example of a prop bet is "Which team will score the first touchdown?" "Prop bet" or "proposition bet" can be integrated into the embodiments in a variety of manners.

A "first-half bet" refers to a bet placed on the score in the first half of the event only and only considers the first half of the game or event. The process in which you go about placing this bet is the same process that you would use to place a full game bet, but as previously mentioned, only the first half is important to a first-half bet type of wager. A "half-time bet" refers to a bet placed on scoring in the second half of a game or event only. "First-half-bet" and "half-time-bet" can be integrated into the embodiments in a variety of manners.

A "futures bet" or "future" refers to the odds that are posted well in advance on the winner of major events. Typical future bets are the Pro Football Championship, Collegiate Football Championship, the Pro Basketball Championship, the Collegiate Basketball Championship, and the Pro Baseball Championship. "Futures bet" or "future" can be integrated into the embodiments in a variety of manners.

The "listed pitchers" is specific to a baseball bet placed only if both pitchers are scheduled to start a game start. If they do not, the bet is deemed "no action" and refunded. The "run line" in baseball refers to a spread used instead of the money line. "Listed pitchers," "no action," and "run line" can be integrated into the embodiments in a variety of manners.

The term "handle" refers to the total amount of bets taken. The term "hold" refers to the percentage of the house wins. The term "juice" refers to the bookmaker's commission, most commonly the 11 to 10 bettors lay on a straight point spread wagers: also known as "vigorish" or "vig." The "limit" refers to the maximum amount accepted by the house before the odds and/or point spread are changed. "Off the board" refers to a game in which no bets are being accepted. "Handle," "juice," "vigorish," "vig," and "off the board" can be integrated into the embodiments in a variety of manners.

"Casinos" are a public room or building where gambling games are played. "Racino" is a building complex or grounds having a racetrack and gambling facilities for playing slot machines, blackjack, roulette, etc. "Casino" and "Racino" can be integrated into the embodiments in a variety of manners.

Customers are companies, organizations, or individuals that would deploy, for fees, and may be part of, or perform, various system elements or method steps in the embodiments.

Managed service user interface service is a service that can help customers (1) manage third parties, (2) develop the web, (3) perform data analytics, (4) connect thru application program interfaces and (4) track and report on player behaviors. A managed service user interface can be integrated into the embodiments in a variety of manners.

Managed service risk management services is a service that assists customers with (1) very important person management, (2) business intelligence, and (3) reporting. These managed service risk management services can be integrated into the embodiments in a variety of manners.

Managed service compliance service is a service that helps customers manage (1) integrity monitoring, (2) play safety, (3) responsible gambling, and (4) customer service assistance. These managed service compliance services can be integrated into the embodiments in a variety of manners.

Managed service pricing and trading service is a service that helps customers with (1) official data feeds, (2) data visualization, and (3) land based on-property digital signage. These managed service pricing and trading services can be integrated into the embodiments in a variety of manners.

Managed service and technology platforms are services that help customers with (1) web hosting, (2) IT support, and (3) player account platform support. These managed service and technology platform services can be integrated into the embodiments in a variety of manners.

Managed service and marketing support services are services that help customers (1) acquire and retain clients and users, (2) provide for bonusing options, and (3) develop press release content generation. These managed service and marketing support services can be integrated into the embodiments in a variety of manners.

Payment processing services are services that help customers with (1) account auditing and (2) withdrawal processing to meet standards for speed and accuracy. Further, these services can provide for the integration of global and local payment methods. These payment processing services can be integrated into the embodiments in a variety of manners.

Engaging promotions allow customers to treat players to free bets, odds boosts, enhanced access, and flexible cashback to boost lifetime value. Engaging promotions can be integrated into the embodiments in a variety of manners.

"Cash out" or "payout" or "payout" allow customers to make available, on singles bets or accumulated bets with a partial cash-out where each operator can control payouts by always managing commission and availability. The "cash out" or "pay out" or "payout" can be integrated into the embodiments in a variety of manners, including both monetary and non-monetary payouts, such as points, prizes, promotional or discount codes, and the like.

"Customized betting" allows customers to have tailored personalized betting experiences with sophisticated tracking and analysis of players behavior. "Customized betting" can be integrated into the embodiments in a variety of manners.

Kiosks are devices that offer interactions with customers, clients, and users with a wide range of modular solutions for both retail and online sports gaming. Kiosks can be integrated into the embodiments in a variety of manners.

Business Applications are an integrated suite of tools for customers to manage the everyday activities that drive sales, profit, and growth by creating and delivering actionable insights on performance to help customers to manage sports gaming. Business Applications can be integrated into the embodiments in a variety of manners.

State-based integration allows for a given sports gambling game to be modified by states in the United States or other countries, based upon the state the player is in, mobile phone, or other geolocation identification means. State-based integration can be integrated into the embodiments in a variety of manners.

Game Configurator allows for the configuration of customer operators to have the opportunity to apply various chosen or newly created business rules on the game as well as to parametrize risk management. The Game Configurator can be integrated into the embodiments in a variety of manners.

"Fantasy sports connectors" are software connectors between method steps or system elements in the embodiments that can integrate fantasy sports. Fantasy sports allow a competition in which participants select imaginary teams from among the players in a league and score points according to the actual performance of their players. For example, if a player in fantasy sports is playing at a given real-time sport, odds could be changed in the real-time sports for that player.

Software as a service (or SaaS) is a software delivery and licensing method in which software is accessed online via a subscription rather than bought and installed on individual computers. SaaS can be integrated into the embodiments in a variety of manners.

Synchronization of screens means synchronizing bets and results between devices, such as TV and mobile, PC, and wearables. Synchronization of screens can be integrated into the embodiments in a variety of manners.

Automatic content recognition (ACR) is an identification technology that recognizes content played on a media device or present in a media file. Devices containing ACR support enable users to quickly obtain additional information about the content they see without any user-based input or search efforts. A short media clip (audio, video, or both) is selected to start the recognition. This clip could be selected from within a media file or recorded by a device. Through algorithms such as fingerprinting, information from the actual perceptual content is taken and compared to a database of reference fingerprints, wherein each reference fingerprint corresponds with a known recorded work. A database may contain metadata about the work and associated information, including complementary media. If the media clip's fingerprint is matched, the identification software returns the corresponding metadata to the client application. For example, during an in-play sports game, a "fumble" could be recognized and at the time stamp of the event, metadata such as "fumble" could be displayed. ACR can be integrated into the embodiments in a variety of manners.

Joining social media means connecting an in-play sports game bet or result to a social media connection, such as a FACEBOOK® chat interaction. Joining social media can be integrated into the embodiments in a variety of manners.

Augmented reality means a technology that superimposes a computer-generated image on a user's view of the real world, thus providing a composite view. In an example of this invention, a real-time view of the game can be seen and a "bet"—which is a computer-generated data point—is placed above the player that is bet on. Augmented reality can be integrated into the embodiments in a variety of manners.

Some embodiments of this disclosure, illustrating all its features, will now be discussed in detail. It can be understood that the embodiments are intended to be open-ended in that an item or items used in the embodiments is not meant to be an exhaustive listing of such items or items or meant to be limited to only the listed item or items.

It can be noted that as used herein and in the appended claims, the singular forms "a," "an," and "the" include plural references unless the context clearly dictates otherwise. Although any systems and methods similar or equivalent to those described herein can be used in the practice or testing of embodiments, only some exemplary systems and methods are now described.

FIG. 1 is a system for displaying news related to a wager. This system may include a live event 102, for example, a sporting event such as a football, basketball, baseball, or hockey game, tennis match, golf tournament, eSports, or digital game, etc. The live event 102 may include some number of actions or plays upon which a user, bettor, or customer can place a bet or wager, typically through an entity called a sportsbook. There are numerous types of wagers the bettor can make, including, but not limited to, a straight bet, a money line bet, or a bet with a point spread or line that the bettor's team would need to cover if the result of the game with the same as the point spread the user would not cover the spread, but instead the tie is called a push. If the user bets on the favorite, points are given to the opposing side, which is the underdog or longshot. Betting on all favorites is referred to as chalk and is typically applied to round-robin or other tournaments' styles. There are other types of wagers, including, but not limited to parlays, teasers, and prop bets, which are added games that often allow the user to customize their betting by changing the odds and payouts received on a wager. Certain sportsbooks will allow the bettor to buy points which moves the point spread off the opening line. This increases the price of the bet, sometimes by increasing the juice, vig, or hold that the sportsbook takes. Another type of wager the bettor can make is an over/under, in which the user bets over or under a total for the live event 102, such as the score of an American football game or the run line in a baseball game, or a series of actions in the live event 102. Sportsbooks have several bets they can handle, limiting the number of wagers they can take on either side of a bet before they will move the line or odds off the opening line. Additionally, there are circumstances, such as an injury to an important player like a listed pitcher, in which a sportsbook, casino, or racino may take an available wager off the board. As the line moves, an opportunity may arise for a bettor to bet on both sides at different point spreads to middle, and win, both bets. Sportsbooks will often offer bets on portions of games, such as first-half bets and half-time bets. Additionally, the sportsbook can offer futures bets on live events in the future. Sportsbooks need to offer payment processing services to cash out customers, which can be done at kiosks at the live event 102 or at another location.

Further, embodiments may include a plurality of sensors 104 that may be used such as motion, temperature, or humidity sensors, optical sensors, and cameras such as an RGB-D camera which is a digital camera capable of capturing color (RGB) and depth information for every pixel in an image, microphones, radiofrequency receivers, thermal imagers, radar devices, lidar devices, ultrasound devices, speakers, wearable devices, etc. Also, the plurality of sensors 104 may include but are not limited to, tracking devices, such as RFID tags, GPS chips, or other such devices embedded on uniforms, in equipment, in the field of play and boundaries of the field of play, or on other markers in the field of play. Imaging devices may also be used as tracking devices, such as player tracking, which provide statistical information through real-time X, Y positioning of players and X, Y, Z positioning of the ball.

Further, embodiments may include a cloud 106 or a communication network that may be a wired and/or wireless network. The communication network, if wireless, may be implemented using communication techniques such as visible light communication (VLC), worldwide interoperability for microwave access (WiMAX), long term evolution (LTE), wireless local area network (WLAN), infrared (IR) communication, public switched telephone network (PSTN), radio waves, or other communication techniques that are known in the art. The communication network may allow ubiquitous access to shared pools of configurable system resources and higher-level services that can be rapidly provisioned with minimal management effort, often over the internet, and relies on sharing resources to achieve coherence and economies of scale, like a public utility. In contrast, third-party clouds allow organizations to focus on their core businesses instead of expending resources on computer infrastructure and maintenance. The cloud 106 may be communicatively coupled to a peer-to-peer wagering network 114, which may perform real-time analysis on the type of play and the result of the play. The cloud 106 may also be synchronized with game situational data such as the time of the game, the score, location on the field, weather conditions, and the like, which may affect the choice of play utilized. For example, in an exemplary embodiment, the cloud 106 may not receive data gathered from the sensors 104 and may, instead, receive data from an alternative data feed, such as Sports Radar®. This data may be compiled substantially immediately following the completion of any play and may be compared with a variety of team data and league data based on a variety of elements, including the current down, possession, score, time, team, and so forth, as described in various exemplary embodiments herein.

Further, embodiments may include a mobile device 108 such as a computing device, laptop, smartphone, tablet, computer, smart speaker, or I/O devices. I/O devices may be present in the computing device. Input devices may include but are not limited to keyboards, mice, trackpads, trackballs, touchpads, touch mice, multi-touch touchpads and touch mice, microphones, multi-array microphones, drawing tablets, cameras, single-lens reflex cameras (SLRs), digital SLRs (DSLRs), complementary metal-oxide-semiconductor (CMOS) sensors, accelerometers, IR optical sensors, pressure sensors, magnetometer sensors, angular rate sensors, depth sensors, proximity sensors, ambient light sensors, gyroscopic sensors, or other sensors. Output devices may include but are not limited to video displays, graphical displays, speakers, headphones, inkjet printers, laser printers, or 3D printers. Devices may include but are not limited to a combination of multiple input or output devices such as, Microsoft KINECT, Nintendo Wii remote, Nintendo WII U GAMEPAD, or Apple iPhone. Some devices allow gesture recognition inputs by combining input and output devices. Other devices allow for facial recognition, which may be utilized as an input for different purposes such as authentication or other commands. Some devices provide for voice recognition and inputs, including, but not limited to, Microsoft KINECT, SIRI for iPhone by Apple, Google Now, or Google Voice Search. Additional user devices have both input and output capabilities, including, but not limited to, haptic feedback devices, touchscreen displays, or multi-touch displays. Touchscreen, multi-touch displays, touchpads, touch mice, or other touch sensing devices may use different technologies to sense touch, including but not limited to capacitive, surface capacitive, projected capacitive touch (PCT), in-cell capacitive, resistive, IR, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality including, but not limited to, pinch, spread, rotate, scroll, or other gestures. Some touchscreen devices, including, but not limited to, Microsoft PIXELSENSE or Multi-Touch Collaboration Wall, may have larger surfaces, such as on a table-top or on a wall, and may also interact with other electronic devices. Some I/O devices, display devices, or groups of devices may be augmented reality devices. An I/O controller may control one or more I/O devices, such as a keyboard and a pointing device or a mouse or optical pen. Furthermore, an I/O device may also contain storage and/or an installation medium for the computing device. In some embodiments, the computing device may include USB connections (not shown) to receive handheld USB storage devices. In further embodiments, an I/O device may be a bridge between the system bus and an external communication bus, e.g., USB, SCSI, FireWire, Ethernet, Gigabit Ethernet, Fiber Channel, or Thunderbolt buses. In some embodiments, the mobile device 108 could be an optional component and would be utilized in a situation where a paired wearable device employs the mobile device 108 for additional memory or computing power or connection to the internet.

Further, embodiments may include a wagering software application or a wagering app 110, which is a program that enables the user to place bets on individual plays in the live event 102, streams audio and video from the live event 102, and features the available wagers from the live event 102 on the mobile device 108. The wagering app 110 allows the user to interact with the wagering network 114 to place bets and provide payment/receive funds based on wager outcomes.

Further, embodiments may include a mobile device database 112 that may store some or all the user's data, the live event 102, or the user's interaction with the wagering network 114.

Further, embodiments may include the wagering network 114, which may perform real-time analysis on the type of play and the result of a play or action. The wagering network 114 (or the cloud 106) may also be synchronized with game situational data, such as the time of the game, the score, location on the field, weather conditions, and the like, which may affect the choice of play utilized. For example, in an exemplary embodiment, the wagering network 114 may not receive data gathered from the sensors 104 and may, instead, receive data from an alternative data feed, such as SportsRadar®. This data may be provided substantially immediately following the completion of any play and may be compared with a variety of team data and league data based on a variety of elements, including the current down, possession, score, time, team, and so forth, as described in various exemplary embodiments herein. The wagering network 114 can offer several software as a service (SaaS) managed services such as user interface service, risk management service, compliance, pricing and trading service, IT support of the technology platform, business applications, game configuration, state-based integration, fantasy sports connection, integration to allow the joining of social media, or marketing support services that can deliver engaging promotions to the user.

Further, embodiments may include a user database 116, which may contain data relevant to all users of the wagering network 114 and may include, but is not limited to, a user ID, a device identifier, a paired device identifier, wagering history, or wallet information for the user. The user database 116 may also contain a list of user account records associated with respective user IDs. For example, a user account record may include, but is not limited to, information such as user interests, user personal details such as age, mobile number, etc., previously played sporting events, highest wager, favorite sporting event, or current user balance and standings. In addition, the user database 116 may contain betting lines and search queries. The user database 116 may be searched based on a search criterion received from the user. Each betting line may include, but is not limited to, a plurality of betting attributes such as at least one of the live event 102, a team, a player, an amount of wager, etc. The user database 116 may include but is not limited to information related to all the users involved in the live event 102. In one exemplary embodiment, the user database 116 may include information for generating a user authenticity report and a wagering verification report. Further, the user database 116 may be used to store user statistics like, but not limited to, the retention period for a particular user, frequency of wagers placed by a particular user, the average amount of wager placed by each user, etc.

Further, embodiments may include a historical plays database 118 that may contain play data for the type of sport being played in the live event 102. For example, in American Football, for optimal odds calculation, the historical play data may include metadata about the historical plays, such as time, location, weather, previous plays, opponent, physiological data, etc. Further, embodiments may utilize an odds database 120—that contains the odds calculated by an odds calculation module 122—to display the odds on the user's mobile device 108 and take bets from the user through the mobile device wagering app 110.

Further, embodiments may include the odds calculation module 122, which utilizes historical play data to calculate odds for in-play wagers.

Further, embodiments may include a news module 124, which may collect data from the sensors 104 of the live event 102 and search for relevant news data in the news database 126. The news data may then be sent to the mobile device 108 to be displayed by the wagering app 110. Relevant news data may be determined by finding information in the news data related to certain aspects of the live event 102, such as teams, players, location, weather, etc.

Further, embodiments may include a news database 126 which may contain news data related to the live event 102. News data may include, but is not limited to, news articles, stats, reports, opinions, live commentary, etc. The data may contain meta tags to assist in searching. News data related to the live event 102 may be news about the live event 102, the teams, players, similar teams or players, similar events, weather, etc.

FIG. 2 illustrates the news module 124. The process may begin with the news module 124 polling, at step 200, for data from the live event 102 via the sensors 104. This polling may occur continuously or at designated periods, such as the end of a play, the close of a previous wager in a wagering system, or the offering of a new wager in a wagering system. The news module 124 may extract, at step 202, searchable data from the sensors 104. Searchable data may be any data that may assist in finding relevant news data. For example, the current active players in the live event 102 and/or their position on the field. In contrast, data such as depth of field, latency, game clock time, and/or noise level, may be present in the sensors 104, but is unlikely to lead to relevant news data and therefore, may not be considered as searchable data. An administrator or another module may determine which data is considered searchable data. The news module 124 may search, at step 204, the news database 126 for news data relevant to the extracted searchable data. For example, if the live event 102 is a baseball game with the Giants playing the Reds and the Giants are at-bat with two outs in the top of the second inning, the news module 124 may search news database 126 for "Giants," "Reds," "Second Inning," and/or "Two Outs" in the text of the news data content. The news module 124 may also search for these terms in the metadata or tags of the news data if available. This search may return, for example, articles concerning either team, prior games between them, recent stats for the teams, articles regarding strategies for the early innings of baseball, commentary on player stress when there are two outs, etc.

The news module 124 may include tags or terms in the search related to an available wager. For example, if a current wager has options such as a walk, single, out, or home run, these may be added to the search terms. The news module 124 may filter results based on the source of the news data. For example, if a user indicated they prefer news from mlb.com, then the search may only return news data from that source. The news module 124 may add additional search criteria not obtained from the sensors 104, such as other teams in the same league that are contending to rank with the current teams. The news module 124 may add default terms to the search criteria to find news data that may impact the play. For example, the news module 124 may add "weather forecast" to the list of terms to find news data on the expected weather. The news module 124 may extract, at step 206, all matches found in the news database 126. The news module 124 may assign, at step 208, a relevance score to each match. The relevance score may depend on the number of search tags or terms that appeared in the content of the news data. For example, a news article that included both "Giants" and "Reds" may have a higher relevance score than one that only included "Giants." Some terms may be weighted higher than others; for example, terms associated with a currently available wager such as "home run" may have a higher relevance score than "Giants." These weights may be set by an administrator or by a module that may use a learning algorithm. The news module 124 may also use natural language processing to determine if the search tags or terms in the news data are relevant. For example, a news article that contains search tags or terms used out of context may receive a lower relevance score than an article where the search tags or terms are the main subjects. The news module 124 may send, at step 210, the matching news data with the highest relevance score to the mobile device 108. The news module 124 may send multiple news data results, for example, the top five most relevant. The mobile device 108 may display the news data via the wagering app 110. If multiple news data results are sent, the mobile device may display them all at once, rotate through the results, choose a result randomly, etc. The news module 124 may return, at step 212, to step 200.

FIG. 3 illustrates the news database 126. The news database 126 may contain news data related to the participants in the live event 102, which may assist users who are deciding how to wager. The news database 126 may contain news articles relevant to the live event 102, the teams, players, similar teams or players, similar events, weather, or any other factor that may inform the user how best to place their wager. The news database 126 may contain titles and content for each entry, a source where the news data was obtained, and/or a date. In one embodiment, the news database 126 may contain sensor data from which relevant information may be extracted. For example, video data may be examined to determine that a player is wincing or limping. The data may then be reported to a user as a "potential injury," after being processed through optical recognition.

The foregoing description and accompanying figures illustrate the principles, preferred embodiments, and modes of operation of the invention. However, the invention should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

The invention claimed is:

1. A method for displaying sports news related to an offered wager, comprising;
   offering a wager on a wagering device that is communicatively coupled to a wagering network;
   collecting real-time sensor data from a live sporting event, including sensor data for one or more active participants in the live sporting event;
   extracting searchable data from the sensor data;
   searching for information on news from a database based on the searchable data from the sensor data or default search terms, wherein the information in the database of news contains searchable meta tags, each meta tag being assigned a weight;
   filtering the information from the database of news based on the wager offered, the sensor data, and the weighted searchable meta tags;
   assigning a relevance score to each piece of filtered information from the database of news; and
   displaying the news information on an at least one mobile device that is communicatively coupled with the wagering network, wherein the information displayed is the information with the highest relevance score.

2. The method for displaying sports news related to an offered wager of claim 1, further comprising filtering the information from the database of news based on the source of the information.

3. The method for displaying sports news related to an offered wager of claim 1, wherein the collecting of the real-time sensor data occurs at designated periods during the course of the live sporting event.

4. The method for displaying sports news related to an offered wager of claim 1, wherein the assigning of the relevance score to each piece of information from the database of news is done through the use of natural language processing.

5. A system for displaying sports news related to an offered wager, comprising:
   a live sporting event upon which wagers are offered;
   one or more sensors that collect data from the live sporting event, including sensor data for one or more active participants in the live sporting event;
   at least one user device with a display;
   a wagering network communicatively coupled with the at least one user device;
   a database which contains news data related to the live event, wherein the news data in the database of news contains searchable meta tags, each meta tag being assigned a weight; and
   a news module which collects data from the one or more sensors, searches the database for news data related to aspects of the live event, filters the information from the database of news based on one or more of the offered wagers and the weighted searchable meta tags, and assigns a relevance score to each piece of filtered information from the database of news,
   wherein the news information is displayed on the display of the at least one user device, wherein the information displayed is the information with the highest relevance score.

6. The system for displaying sports news related to an offered wager of claim 5, further comprising a wager placed on the wagering network communicatively coupled with the at least one user device;
   wherein the news module filters the news data in the database based on the wager placed on the wagering network communicatively coupled with the at least one user device.

7. The system for displaying sports news related to an offered wager of claim 5, wherein the one or more sensors that collect data from the live sporting event collect data at one of designated times or periods during the live sporting event.

8. The system for displaying sports news related to an offered wager of claim 5, wherein the news module filters the news data in the database based on the source of the news data.

9. The system for displaying sports news related to an offered wager of claim 5, wherein when multiple relevant news data are found, the news module displays the relevant news data all at once on the at least one user device.

10. The system for displaying sports news related to an offered wager of claim 5, wherein when multiple relevant news data are found, the news module rotates through displaying the relevant news data on the at least one user device.

11. A method for displaying relevant data from a database of news on a mobile device associated with a wagering network comprising, executing on a processor the steps of:
    displaying data associated with a live sporting event,
    displaying one or more available wagers associated with the live sporting event,
    displaying a placed wager,
    displaying an indication that sensor data associated with a subject of the placed wager is available including sensor data for one or more active participants in the live sporting event,
    filtering information from the database of news based on the placed wager and the sensor data, wherein the information in the database of news contains searchable meta tags, each meta tag being assigned a weight;
    assigning a relevance score to each piece of filtered information from the database of news; and
    displaying a list of news associated with the sensor data, based on information from the database with the highest relevance score.

* * * * *